United States Patent

Kaneko et al.

[11] Patent Number: 5,761,187
[45] Date of Patent: Jun. 2, 1998

[54] MULTI-LAYER OPTICAL DISK

[75] Inventors: Masahiko Kaneko, Kanagawa; Katsuhisa Aratani, Chiba; Ariyoshi Nakaoki, Tokyo, all of Japan

[73] Assignee: Sony Corporation, Tokyo, Japan

[21] Appl. No.: 697,275

[22] Filed: Aug. 27, 1996

[30] Foreign Application Priority Data

Aug. 31, 1995 [JP] Japan ................... 7-224341

[51] Int. Cl.$^6$ ................... G11B 7/24
[52] U.S. Cl. ................... 369/275.1; 369/94
[58] Field of Search ................... 369/275.1, 94, 369/286, 281, 272, 273, 292, 109

[56] References Cited

U.S. PATENT DOCUMENTS

| | | | |
|---|---|---|---|
| 4,450,553 | 5/1984 | Holster et al. | 369/94 |
| 5,199,022 | 3/1993 | Suzuki et al. | |
| 5,202,875 | 4/1993 | Rosen et al. | 369/94 |
| 5,251,198 | 10/1993 | Strickler | 369/94 |
| 5,373,499 | 12/1994 | Imaino et al. | 369/275.1 |
| 5,526,338 | 6/1996 | Hasman et al. | 369/275.1 |
| 5,563,873 | 10/1996 | Ito et al. | 369/275.1 |
| 5,606,546 | 2/1997 | Best et al. | 369/275.1 |
| 5,608,715 | 3/1997 | Yokogawa et al. | 369/275.1 |
| 5,615,186 | 3/1997 | Rosen et al. | 369/94 |

FOREIGN PATENT DOCUMENTS

| | | |
|---|---|---|
| A-2 0 184 452 | 6/1986 | European Pat. Off. |
| A-0 388 852 | 9/1990 | European Pat. Off. |
| A- 0 658 887 | 6/1995 | European Pat. Off. |
| A-1 0 658 887 | 6/1995 | European Pat. Off. |
| 53-167506 | 12/1978 | Japan ................... 369/94 |
| A-96 04650 | 2/1996 | WIPO. |

OTHER PUBLICATIONS

Patent Abstracts of Japan, vol. 018, No. 278 (P-1743), May 26, 1994 & JP-A-06 044611 (Nippon Columbia Co., Ltd.), Feb. 18, 1994.

*Primary Examiner*—Tan Dinh
*Attorney, Agent, or Firm*—Hill & Simpson

[57] ABSTRACT

The present invention provides a multi-layer optical disk, in which even if a wave length of read light is changed at a time of reproducing, both of reproduction signals from a first information memory layer and a second information memory layer have sufficient levels.

In a multi-layer optical disk, in which a first information memory layer and a second information memory layer are sequentially film-formed on a substrate and information recorded on the first information memory layer and the second information memory layer are reproduced by irradiating read light from a substrate side, the first information memory layer and the second information memory layer can be reproduced by a first read light and a second read light which is shorter in wave length than this first read light, and the first information memory layer is made of material in which a refractive index n and an extinction coefficient k in a wave length area of the first read light comply with the following conditions:

$$0 \leq k \leq 0.25$$

$$n = \alpha - k + 2.8$$

(where $\alpha$ is a constant and $0.15 \leq \alpha \leq 0.45$)

6 Claims, 24 Drawing Sheets

(SIN : H2, $\lambda$ = 635, n = 3.18, k = 0.04)

MULTI-LAYER OPTICAL DISK

BACKGROUND OF THE INVENTION

1. Field of the Invention

The present invention relates to a multi-layer optical disk, in which information memory layer for storing information is constituted in a form of a multi-layer and which can process a large capacity of information by changing a focal point of a read light to thereby reproduce the information from each of the information memory layers. More particularly, the present invention relates to improvement in order to reserve compatibility to two types of the read lights having different wave lengths.

2. Description of the Related Art

Recently, in conjunction with development of so-called multi-media, it has been strongly required to store a large capacity of information, such as digital animation, carry out a random-access and reproduce as necessary.

An optical disk, for example a compact disk and the like, is an information memory medium having features that it can carry out the random-access, has a large capacity and is removable. Although the optical disk is used widely in various fields, it is required to process larger information on one surface of the disk than that of a conventional type because of the above mentioned necessity.

In view of the above mentioned circumstance, a multi-layer optical disk in which information memory layers for storing the information are laminated in a thickness direction in a form of the multi-layer is proposed in order to expand a capacity of the optical disk. This multi-layer optical disk makes the information memory layer in a form of the multi-layer to extremely increase the amount of information that can be read out from the one surface of the disk. Also this multi-layer optical disk can process a large capacity of information, without losing the random-access function, by changing the focal point of the read light on the basis of each of the information memory layers.

The followings are typical reports with respect to the multi-layer disk:

(1) a concept of reproducing a multi-layer disk by changing a focal point (U.S. Pat. No. 3,946,367);

(2) a method of reading out by means of transmission light or reflection light by using a multi-layer optical disk having information memory layers laminated in a form of several layers on one surface of a substrate (U.S. Pat. No. 4,219,704); and (3) A reproducing system for a multi-layer optical disk having an aberration correcting function within an optical system (U.S. Pat. No. 5,202,875).

The followings are actual configurations of the multi-layer optical disk:

(1) a dedicated reproduction two-layer optical disk (W. Imaio, H. J. Rosen, K. A. Rubin, T. S. Strand, and M. E. Best, Proc. SPIE vol. 2338, Optical Data Storage, Dana Point, 1994 pp. 254–259); and (2) a write once type two-layer optical disk (K. A. Rubin, H. J. Rosen, W. W. Tang, W. Imaio, and T. S. Strand, Proc. SPIE vol. 2338, Optical Data Storage, Dana Point, 1994 pp. 247–253).

In all of the above mentioned disks, the disk is designed in such a way that the information memory layer has construction of a multi-layer, that translucent material having a high light transmittance, such as dielectric film or dye, is used as configuration material of a record layer near the substrate (a first information memory layer), and that a reflectivity $R_1$ from the first information memory layer is nearly equal to a final reflectivity $T_1^2 R_2$ from a second information memory layer. Here, $R_1$ is the reflectivity of the first information memory layer, $T_1$ is the transmittance of the first information memory layer, and $R_2$ is the reflectivity of the second information memory layer.

The reproduction performance of the multi-layer optical disk is mainly determined on the basis of the reflectivity and the transmittance in the first information memory layer formed on an incident side of the read light. However, these items depends on spectral characteristics (a refractive index n and an extinction coefficient k) of the translucent film material used in the first information memory layer, and a film thickness thereof.

However, in general, there is wave length dependency in optical constants, such as the refractive index n, the extinction coefficient k and the like. Therefore, selection of the material of the translucent film providing an optimum reproducing condition, or a disk construction such as a film thickness and the like are varied on the basis of a wave length of a used read light, for example, a semiconductor laser. Thus, for example, in a case of a multi-layer optical disk adjusted for the read light having the wave length of 635 nm, the reproduction is not always carried out under a correct condition, and it is necessary to prepare a disk adjusted separately, in the other read light wave length of, for example, 480 nm. Thus, there is a defect in so-called compatibility and the like.

Especially, since making the wave length of the read light shorter is an indispensable technical subject in making the capacity of the optical disk larger, it is very important to solve the above problem of compatibility.

SUMMARY OF THE INVENTION

It is therefore an object of the present invention to provide a multi-layer optical disk, in which even if the wave length of the read light is changed at a time of reproducing, both of reproduction signals from a first information memory layer and a second information memory layer have sufficient levels.

The inventors of the present invention have researched for long in order to attain the above mentioned object. As a result, it is discovered that the reflectivity from the respective layers in the second read light wave length can be nearly equal to each other, by setting the spectral characteristics (the refractive index n and the extinction coefficient k) of the first information memory layer to a correct range in the first read light wave length. Further, the multi-layer optical disk having an actual reflection coefficient can be implemented. Accordingly, the present invention can be completed.

Namely, the present invention is characterized by a multi-layer optical disk, in which a first information memory layer and a second information memory layer are sequentially film-formed on a substrate and information recorded on the first information memory layer and the second information memory layer are reproduced by irradiating the read light from a substrate side, wherein the first information memory layer and the second information memory layer can be reproduced by a first read light and a second read light which is shorter in wave length than the first read light, and wherein the first information memory layer is made of material in which the refractive index n and the extinction coefficient k in a wave length area of the first read light meet the following conditions:

$$0 \leq k \leq 0.25$$

$n=\alpha \cdot k+2.8$ (where $\alpha$ is a constant and $0.15 \leq \alpha \leq 0.45$)

The above mentioned conditions are represented by the slant line area in FIG. 1, when the refractive index n is indicated on a horizontal axis and the extinction coefficient k is indicated on a vertical axis.

The film can be constituted in which both of the reflectivity from the first information memory layer and the second information memory layer are sufficiently large, in both the read light wave lengths of, for example, 635 nm and 480 nm, by selecting translucent film material of the first information memory layer so as to meet the above conditions. It is possible to arbitrarily switch the information between the first information memory layer and the second information memory layer to thereby reproduce, by changing the focal point to reproduce. That is, it is possible to implement a large capacity of a multi-layer optical disk having two wave length compatibility.

However, if the spectral characteristic of the first information memory layer varies too largely with respect to the second read light wave length, a range in which the above compatibility can be attained becomes narrow, and at last such a range does not exist. Thus, it is desirable that a difference $\Delta k$ between an extinction coefficient in a wave length range the first read light of the first information memory layer and an extinction coefficient in a wave length range of the second read light is equal to or less than 0.3.

As the translucent film material which meets the above mentioned conditions, there is, for example, an Si system material including hydrogen and at least one of nitride and oxygen, such as Si—N—H, Si—O—H, Si—N—O—H and the like.

The multi-layer optical disk in accordance with the present invention is constituted in such a way that the first information memory layer and the second information memory layer which meets the above mentioned conditions are sequentially film-formed on the substrate. Here, the film thicknesses of the respective information memory layers are arbitrary. However, in order to reserve the two wave length compatibility, it is desirable that the film thickness of the first information memory layer is between 40 nm and 60 nm.

In the multi-layer optical disk having the above mentioned configuration, it is desirable to dispose a spacer layer between the first information memory layer and the second information memory layer, in order to surely separate the focal points in the respective information memory layers. It is also desirable that this spacer layer is made of optically transparent material and a thickness thereof is equal to or more than 30 µm.

In the present invention, it is possible to arbitrarily set the wave length of the first read light and the wave length of the second read light. However, the wave length area of the first read light is selected between 630 nm and 690 nm, for example 635 nm, for utilization. On the other hand, the wave length area of the second read light is assumed to be shorter than that of the first read light, and selected between 450 nm and 630 nm, for example 480 nm.

According to the present invention having the above mentioned configuration, the reflection coefficients from the first information memory layer and the second information memory layer can be made nearly equal to each other and practical. As a result, it is possible to implement the multi-layer optical disk having the compatibility to the two wave length read lights.

Further objects and advantages of the present invention will be apparent from the following description of the preferred embodiments of the invention as illustrated in the accompanying drawings.

DESCRIPTION OF THE PREFERRED EMBODIMENTS

Figure 2:
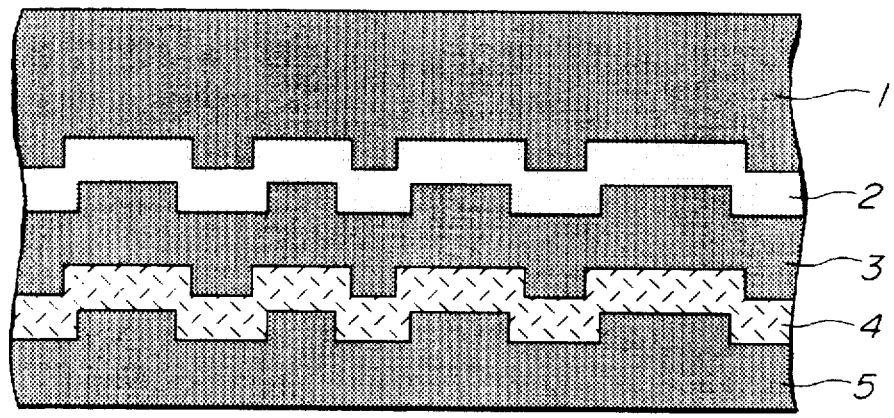
FIG. 2 is a section view that schematically shows a main portion of one configuration example of a multi-layer optical disk to which the present invention is applied.

Next, an actual configuration example of a multi-layer optical disk to which the present invention is applied will be explained in detail with reference to the drawings. As shown in FIG. 2, the multi-layer optical disk in accordance with the present invention is constituted in such a way that a first information memory layer 2 dedicated to reproduce, a spacer layer 3 and a second information memory layer 4 dedicated to reproduce are sequentially film-formed on a substrate 1. Further, a protective layer 5 made of ultraviolet light curing resin and the like is formed so as to cover them.

The substrate 1 may be made of glass or high polymer plastic, such as poly-carbonate and the like. A first information is recorded as a concave and convex pit, by means of a 2P (photo polymerization) method and the like in a case of the glass substrate, or an injection molding method and the like in a case of the high polymer plastic such as the poly-carbonate and the like.

The first information memory layer 2 is film-formed on the concave and convex pit of the substrate 1 by a predetermined film thickness by using a vacuum evaporation method, or a spattering method and the like, and defined as a dedicated reproduction layer.

Further, the spacer layer 3 is formed thereon. It is desired that the spacer layer 3 has a thickness equal to or more than 30 μm. Thus, the spacer layer 3 is formed, for example, by coating with the ultraviolet light curing resin by means of a spin coating method.

And, a second information is recorded on a surface of the spacer layer 3 as the concave and convex pit, for example, by using the 2P method and the like. Further, the second information memory layer 4 is film-formed thereon. In this embodiment, since the second information memory layer 4 is also defined as the dedicated reproduction layer, an aluminum film with a thickness of 100 nm is film-formed. Other materials can be used as configuration material of the second information layer 4, if it has a sufficient reflectivity in a used wave length area. Further, the film thickness is not limited to 100 nm. Further, a recording function can be added as the second information layer 4 by using a rewritable material represented by a magneto-optic material, a phase changeable material and the like or a write once type material.

Various information memory layers are formed by using the laminating technique in this embodiment. It is also possible, for example, to stick two sheets of the substrate on which the various information layers are formed to thereby define the multi-layer optical disk.

Figure 3:
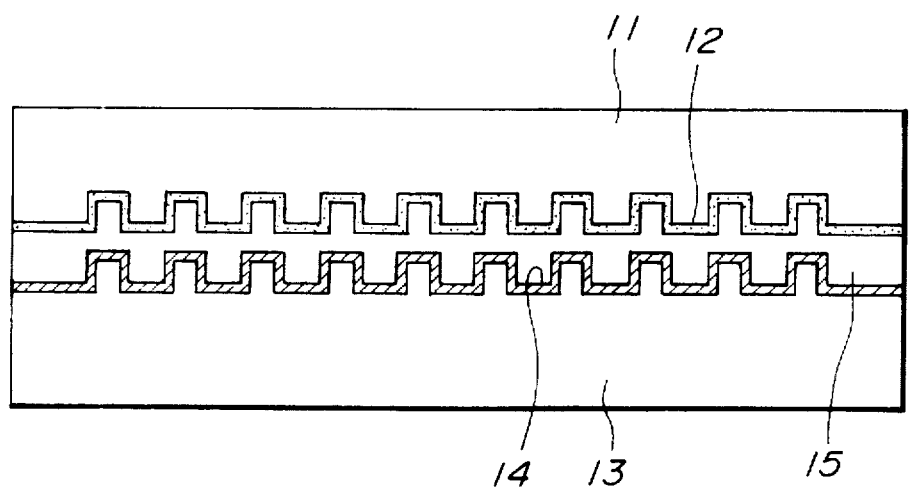
FIG. 3 is a section view that schematically shows a main portion and illustrates other configuration example of a multi-layer optical disk to which the present invention is applied.

FIG. 3 shows a multi-layer optical disk in which two sheets of the substrate are stuck to each other. A first information and a second information are respectively recorded as the concave and convex pits on a first substrate 11 and a second substrate 12 made of the high polymer plastic, such as the glass, or the poly-carbonate and the like, by means of the injection molding and the like.

A translucent film, such as SiN, $SiO_2$ and the like, is formed on the concave and convex pit of the first substrate by means of the evaporation, the spattering and the like, and thereby the first information memory layer 12 is formed.

An Al evaporation film is formed on the concave and convex pit of the second substrate, and thereby the second information memory layer 14 is formed.

The first substrate 11 on which the first information memory layer 12 is formed and a second substrate 13 on which a second information memory layer 14 is formed are jointed to each other through a transparent layer 15. The transparent layer 15 is cured, for example, by putting an ultraviolet light curing type of transparent resin, which is a photo-curing type of transparent resin, between both the substrates, and by compressing both of them and irradiating ultraviolet light from a side of the first transparent substrate 11.

Figure 4:
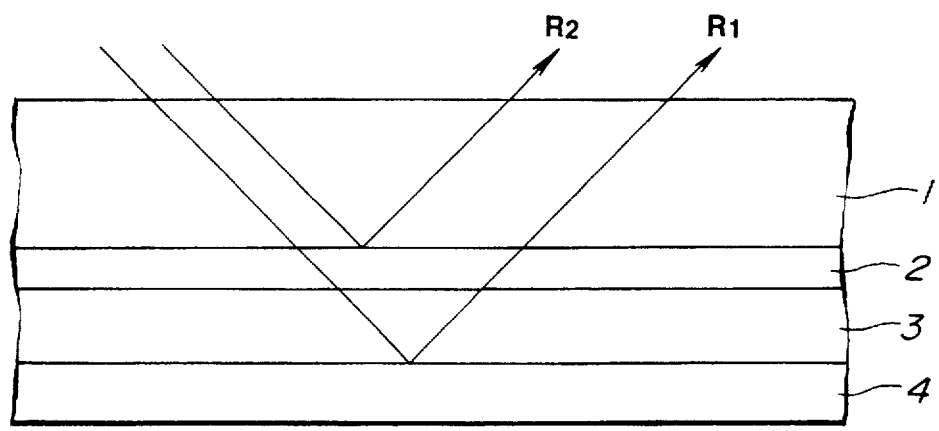
FIG. 4 is a diagrammatic view showing reflection light from respective information memory layers.
Figure 5A:
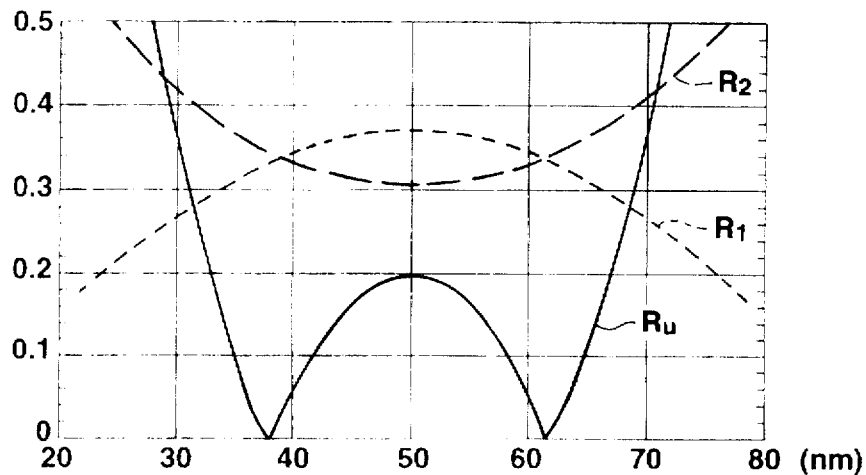
FIG. 5A is a characteristic graph indicating reflection coefficient $R_1$, $R_2$, and $R_u$ in a case of a wave length of 635 nm (where, refractive index n=3.18 and extinction coefficient k=0.04 at a time of the wave length=635 nm)
Figure 5B:
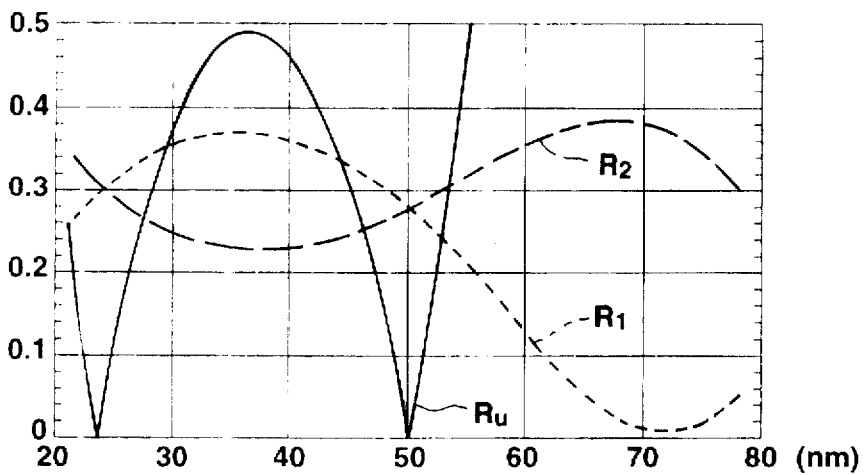
FIG. 5B is a characteristic graph indicating $R_1$, $R_2$, and $R_u$ in a case of a wave length of 480 nm (where, n=3.32 and k=0.18 at a time of the wave length=480 nm)
Figure 6A:
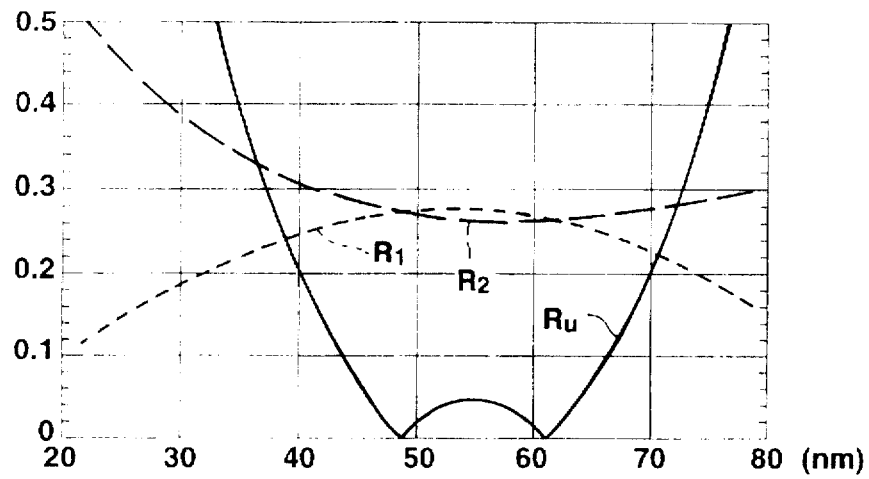
FIG. 6A is a characteristic graph indicating $R_1$, $R_2$, and $R_u$ in a case of a wave length of 635 nm (where, n=2.95 and k=0.22 at a time of the wave length=635 nm)
Figure 6B:
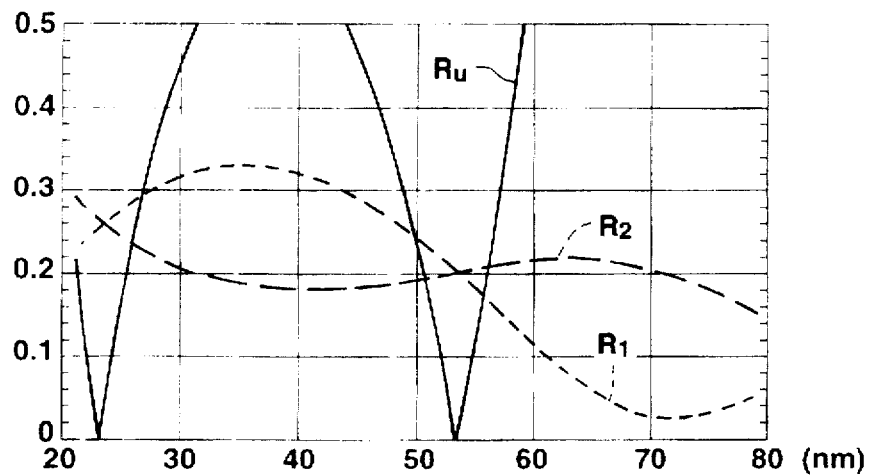
FIG. 6B is a characteristic graph indicating $R_1$, $R_2$, and $R_u$ in a case of a wave length of 480 nm (where, n=3.28 and k=0.33 at a time of the wave length=480 nm)
Figure 7A:
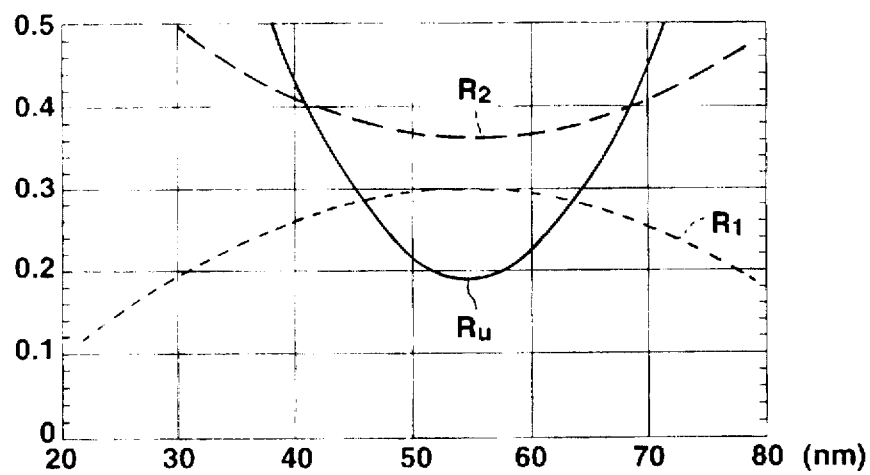
FIG. 7A is a characteristic graph indicating $R_1$, $R_2$, and $R_u$ in a case of a wave length of 635 nm (where, n=2.91 and k=0.06 at a time of the wave length=635 nm)
Figure 8A:
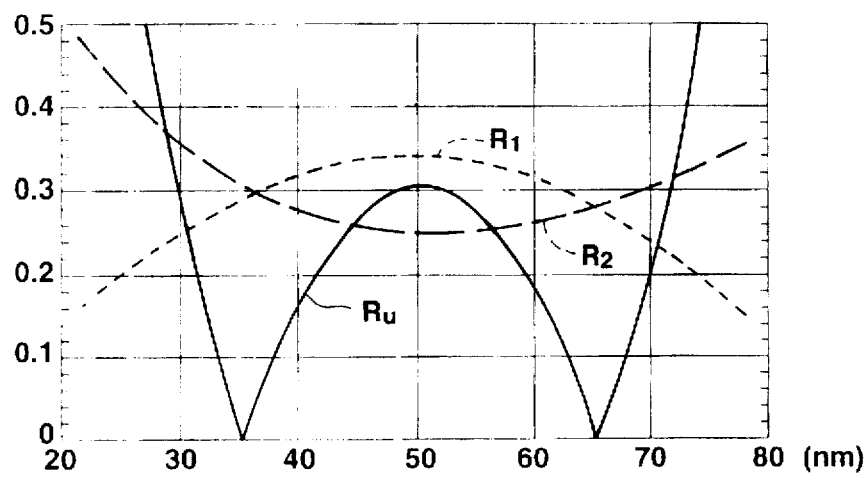
FIG. 8A is a characteristic graph indicating $R_1$, $R_2$, and $R_u$ in a case of a wave length of 635 nm (where, n=3.18 and k=0.17 at a time of the wave length=635 nm)
Figure 8B:
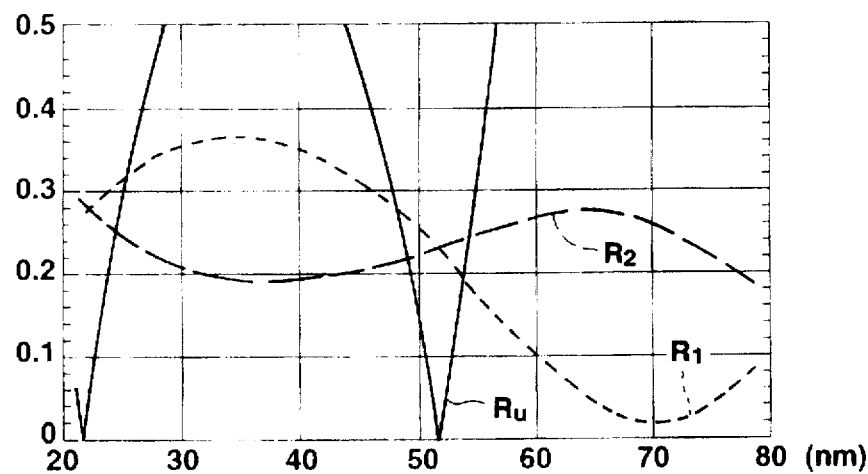
FIG. 8B is a characteristic graph indicating $R_1$, $R_2$, and $R_u$ in a case of a wave length of 480 nm (where, n=3.4 and k=0.26 at a time of the wave length=480 nm)
Figure 9A:
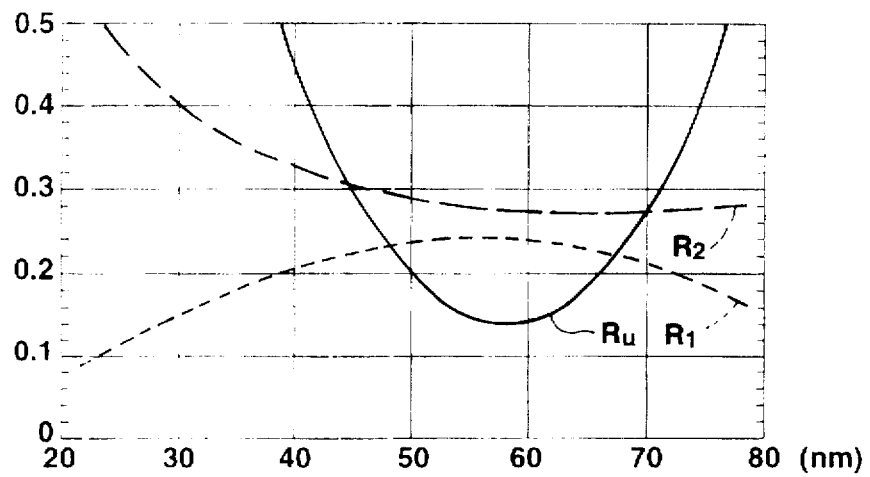
FIG. 9A is a characteristic graph indicating $R_1$, $R_2$, and $R_u$ in a case of a wave length of 635 nm (where, n=2.81 and k=0.24 at a time of the wave length=635 nm)
Figure 9B:
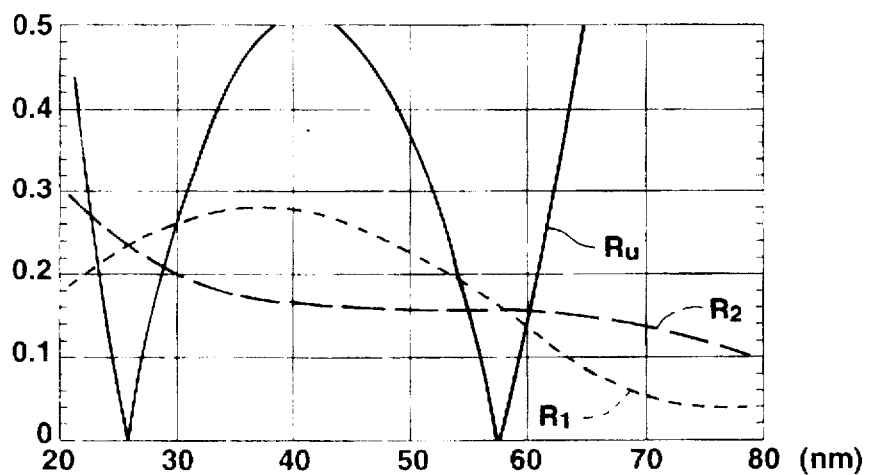
FIG. 9B is a characteristic graph indicating $R_1$, $R_2$, and $R_u$ in a case of a wave length of 480 nm (where, n=3.1 and k=0.43 at a time of the wave length=480 nm)
Figure 10A:
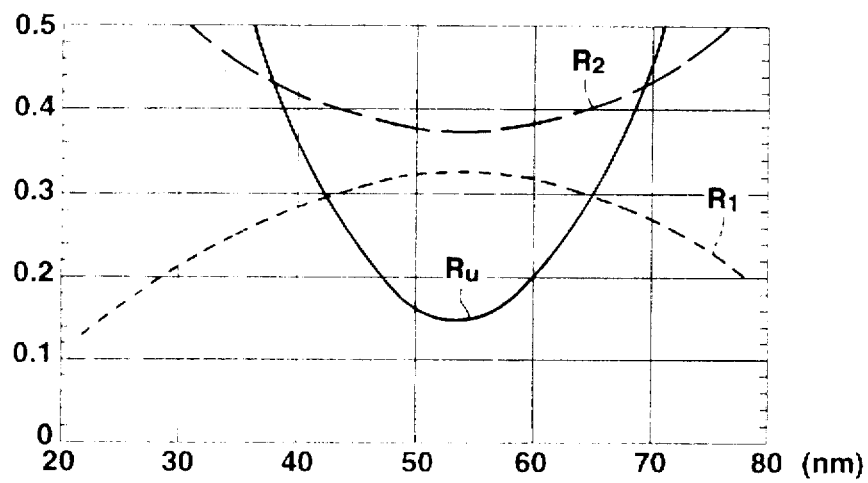
FIG. 10A is a characteristic graph indicating $R_1$, $R_2$, and $R_u$ in a case of a wave length of 635 nm (where, n=2.96 and k=0.02 at a time of the wave length=635 nm)
Figure 10B:
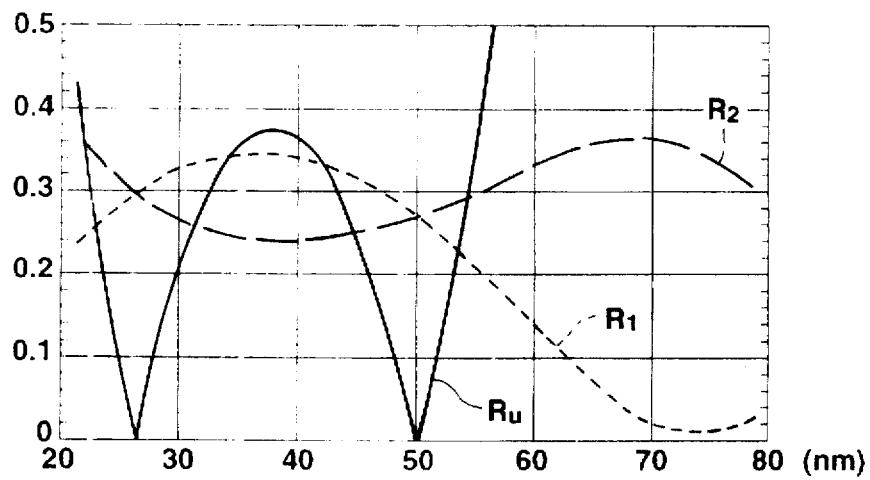
FIG. 10B is a characteristic graph indicating $R_1$, $R_2$, and $R_u$ in a case of a wave length of 480 nm (where, n=3.22 and k=0.19 at a time of the wave length=480 nm)
Figure 11A:
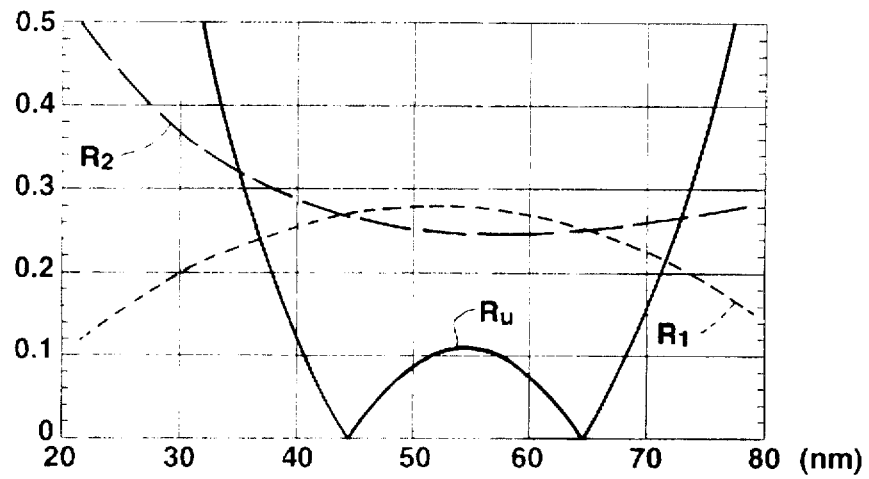
FIG. 11A is a characteristic graph indicating $R_1$, $R_2$, and $R_u$ in a case of a wave length of 635 nm (where, n=2.98 and k=0.24 at a time of the wave length=635 nm)
Figure 11B:
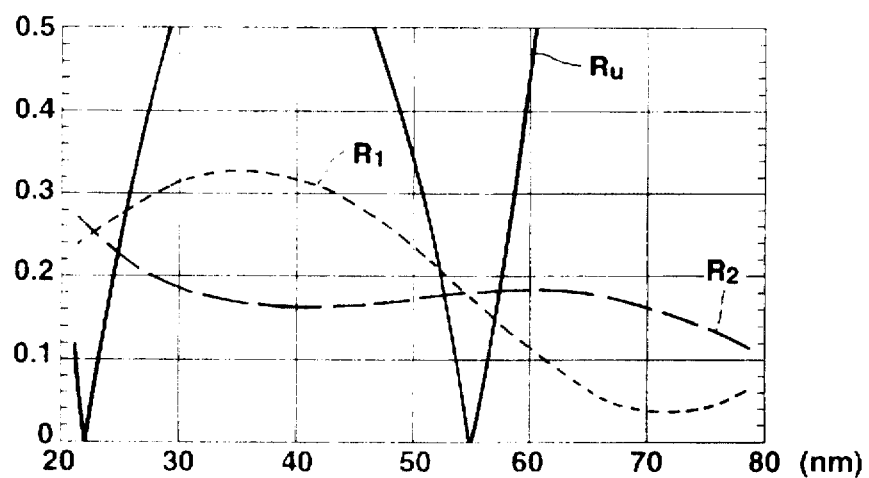
FIG. 11B is a characteristic graph indicating $R_1$, $R_2$, and $R_u$ in a case of a wave length of 480 nm (where, n=3.31 and k=0.38 at a time of the wave length=480 nm)
Figure 12A:
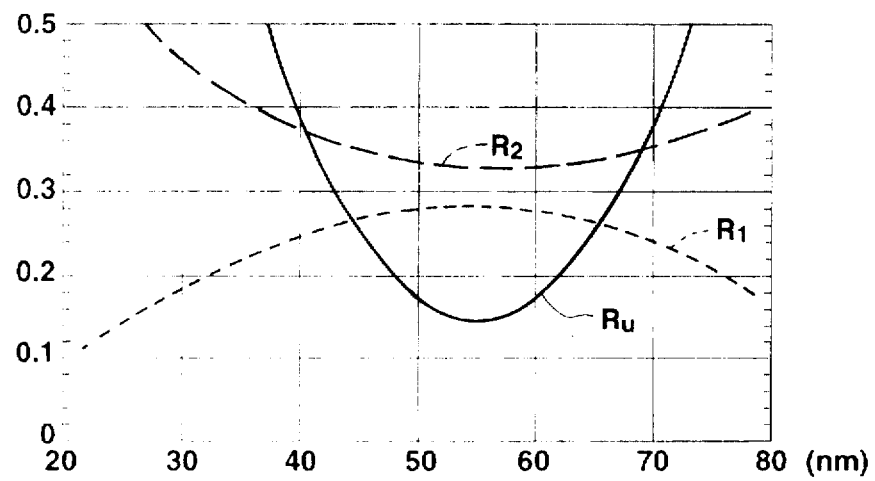
FIG. 12A is a characteristic graph indicating $R_1$, $R_2$, and $R_u$ in a case of a wave length of 635 nm (where, n=2.90 and k=0.12 at a time of the wave length=635 nm)
Figure 12B:
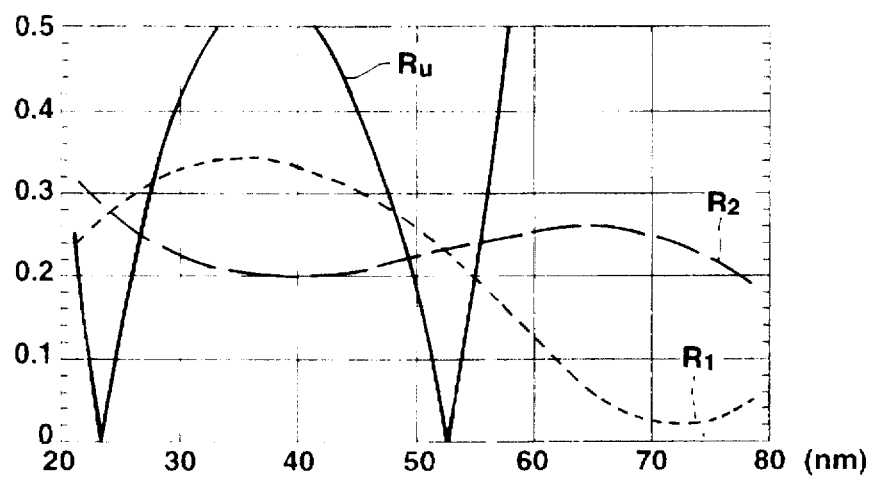
FIG. 12B is a characteristic graph indicating $R_1$, $R_2$, and $R_u$ in a case of a wave length of 480 nm (where, n=3.28 and k=0.28 at a time of the wave length=480 nm)
Figure 13A:
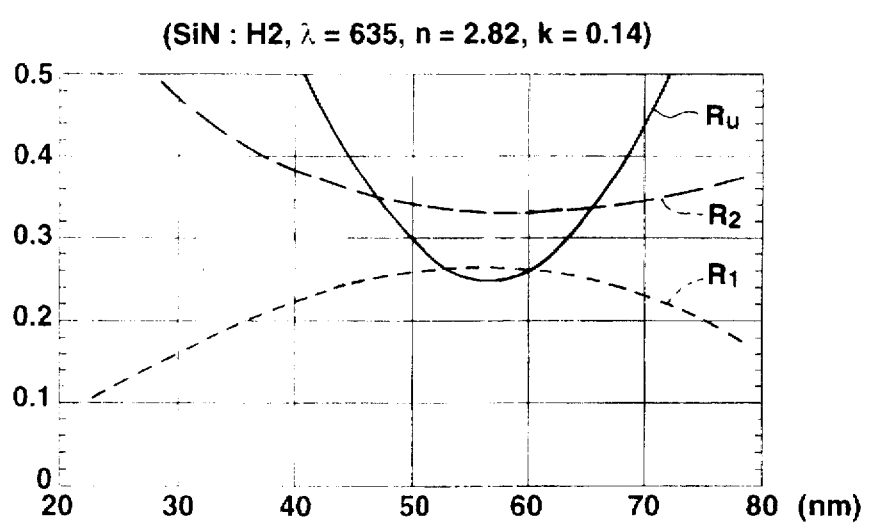
FIG. 13A is a characteristic graph indicating $R_1$, $R_2$, and $R_u$ in a case of a wave length of 635 nm (where, n=2.82 and k=0.14 at a time of the wave length=635 nm)
Figure 14A:
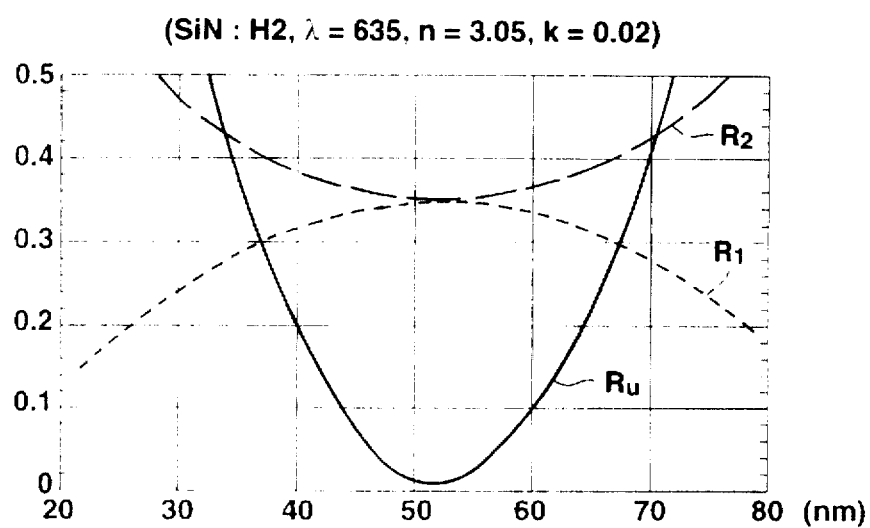
FIG. 14A is a characteristic graph indicating $R_1$, $R_2$, and $R_u$ in a case of a wave length of 635 nm (where, n=3.05 and k=0.02 at a time of the wave length=635 nm)
Figure 14B:
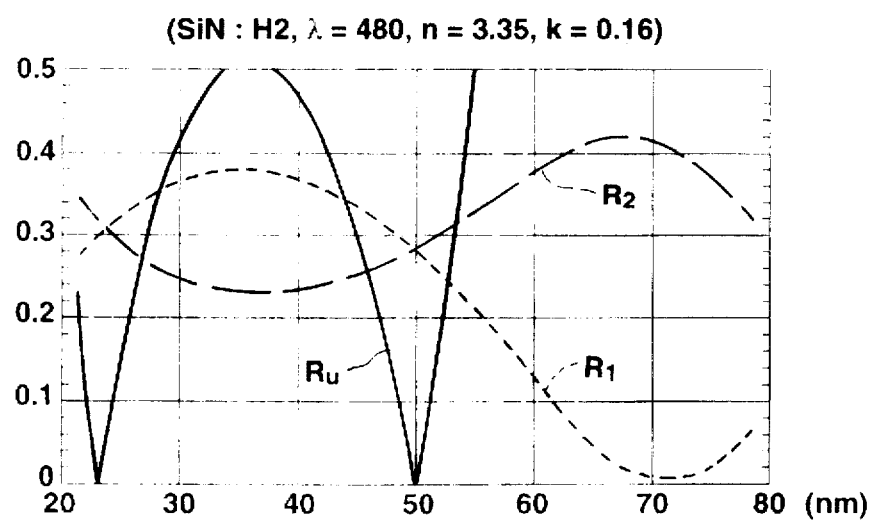
FIG. 14B is a characteristic graph indicating $R_1$, $R_2$, and $R_u$ in a case of a wave length of 480 nm (where, n=3.35 and k=0.16 at a time of the wave length=480 nm)
Figure 15A:
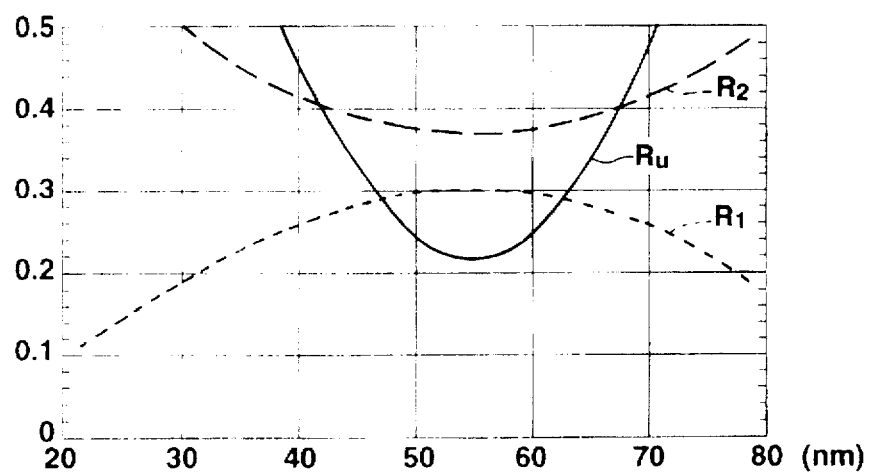
FIG. 15A is a characteristic graph indicating $R_1$, $R_2$, and $R_u$ in a case of a wave length of 635 nm (where, n=2.90 and k=0.05 at a time of the wave length=635 nm)
Figure 16A:
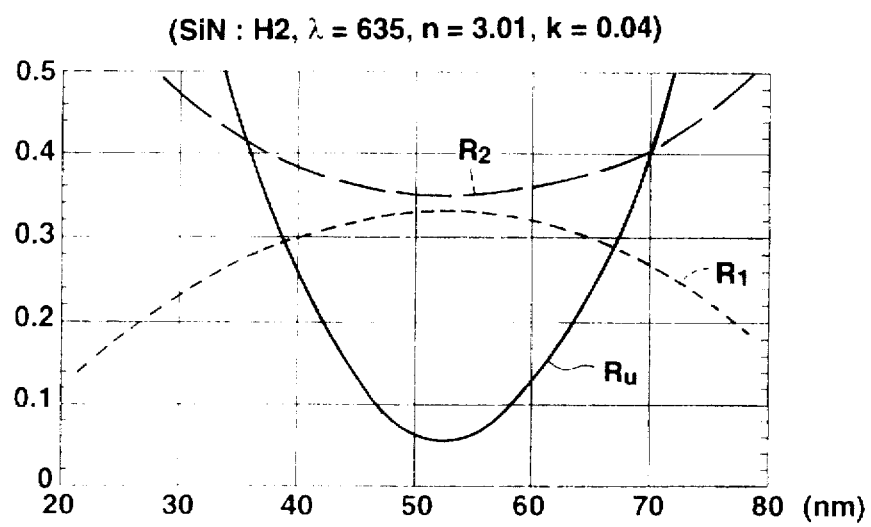
FIG. 16A is a characteristic graph indicating $R_1$, $R_2$, and $R_u$ in a case of a wave length of 635 nm (where, n=3.01 and k=0.04 at a time of the wave length=635 nm)
Figure 16B:
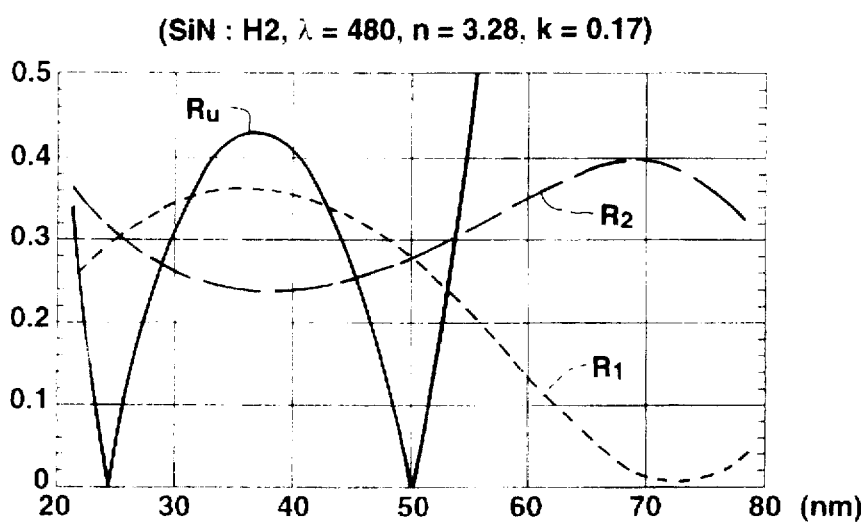
FIG. 16B is a characteristic graph indicating $R_1$, $R_2$, and $R_u$ in a case of a wave length of 480 nm (where, n=3.28 and k=0.17 at a time of the wave length=480 nm)
Figure 17A:
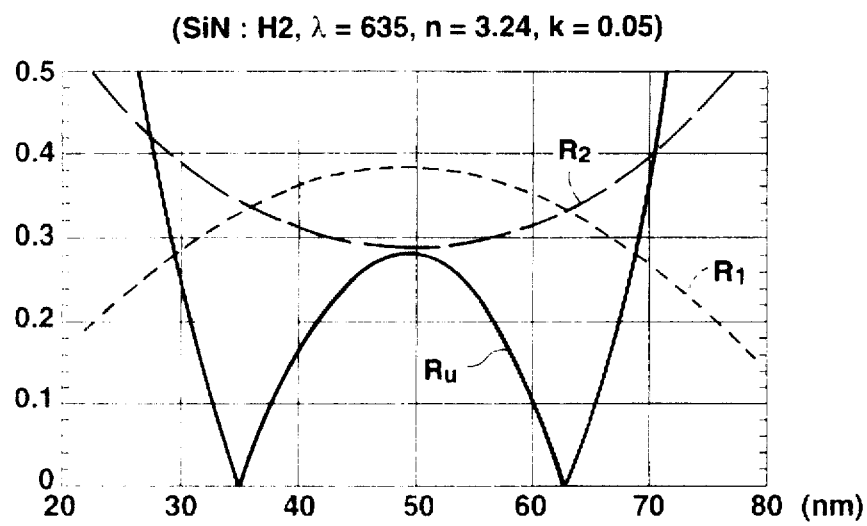
FIG. 17A is a characteristic graph indicating $R_1$, $R_2$, and $R_u$ in a case of a wave length of 635 nm (where, n=3.24 and k=0.05 at a time of the wave length=635 nm)
Figure 17B:
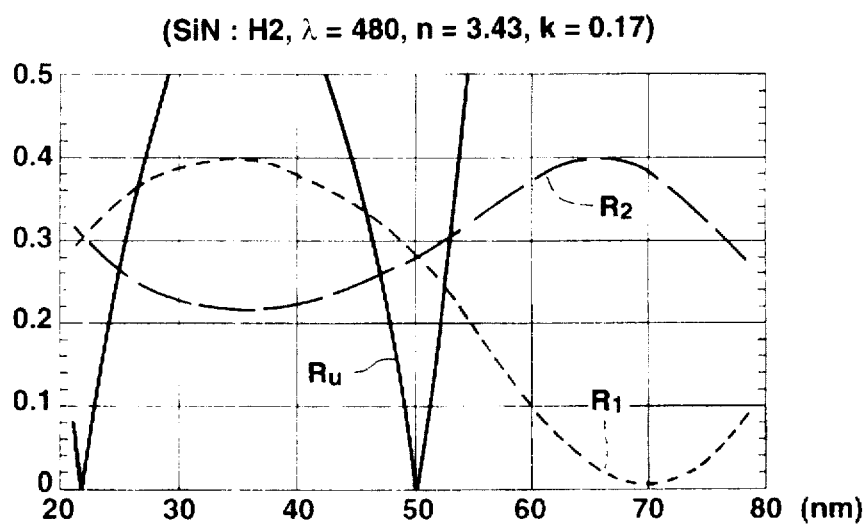
FIG. 17B is a characteristic graph indicating $R_1$, $R_2$, and $R_u$ in a case of a wave length of 480 nm (where, n=3.43 and k=0.17 at a time of the wave length=480 nm)
Figure 18A:
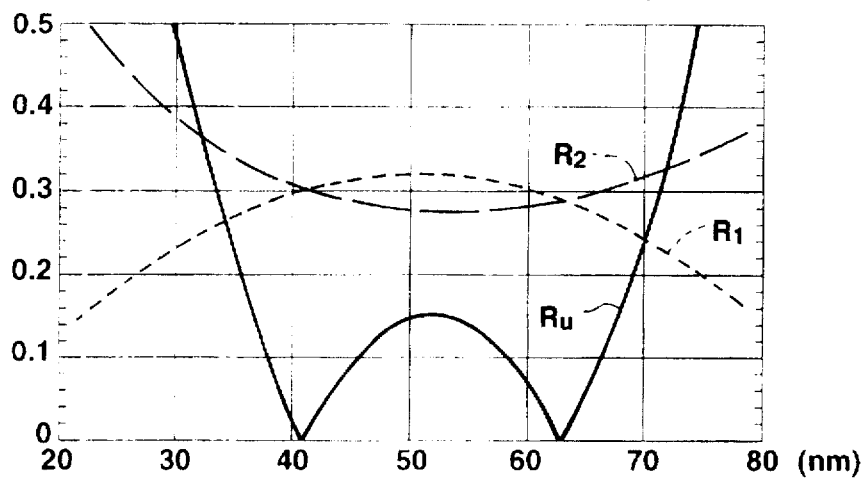
FIG. 18A is a characteristic graph indicating $R_1$, $R_2$, and $R_u$ in a case of a wave length of 635 nm (where, n=3.08 and k=0.15 at a time of the wave length=635 nm)
Figure 18B:
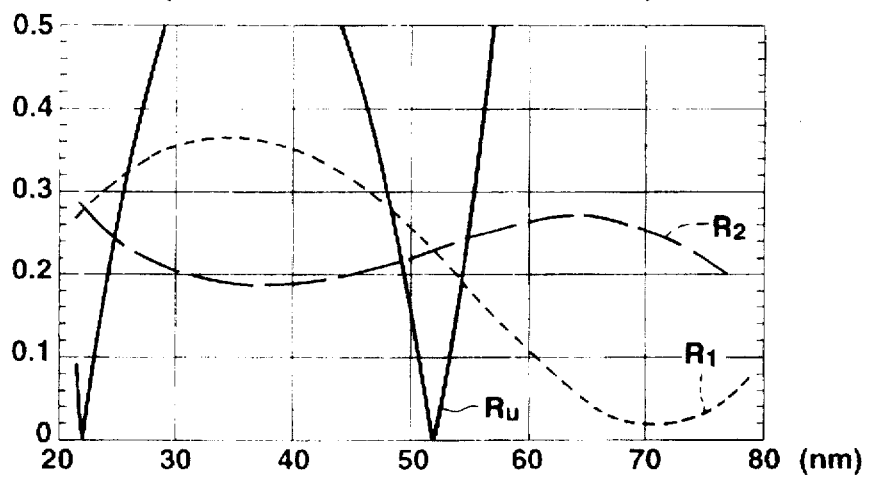
FIG. 18B is a characteristic graph indicating $R_1$, $R_2$, and $R_u$ in a case of a wave length of 480 nm (where, n=3.38 and k=0.27 at a time of the wave length=480 nm)
Figure 19A:
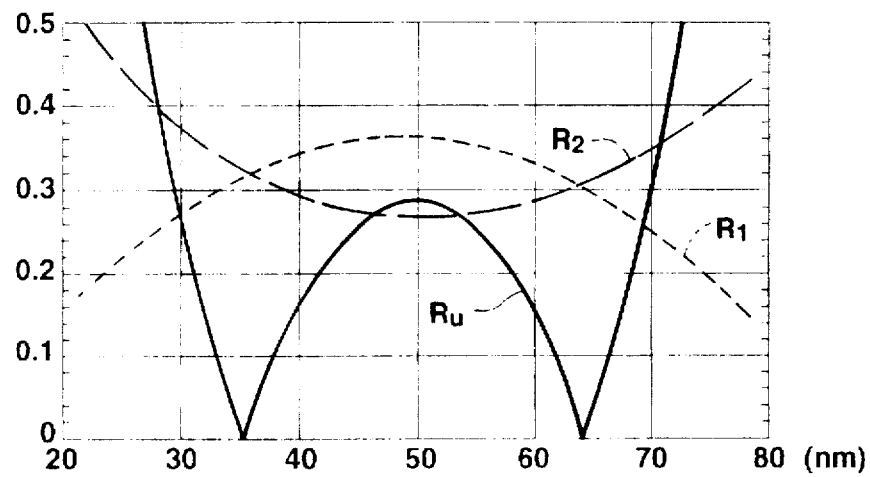
FIG. 19A is a characteristic graph indicating $R_1$, $R_2$, and $R_u$ in a case of a wave length of 635 nm (where, n=3.21 and k=0.11 at a time of the wave length=635 nm)
Figure 19B:
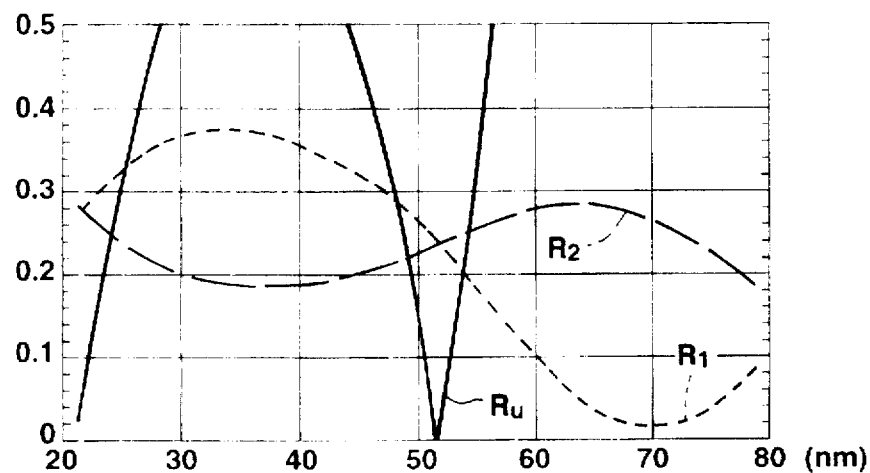
FIG. 19B is a characteristic graph indicating $R_1$, $R_2$, and $R_u$ in a case of a wave length of 480 nm (where, n=3.42 and k=0.26 at a time of the wave length=480 nm)
Figure 20A:
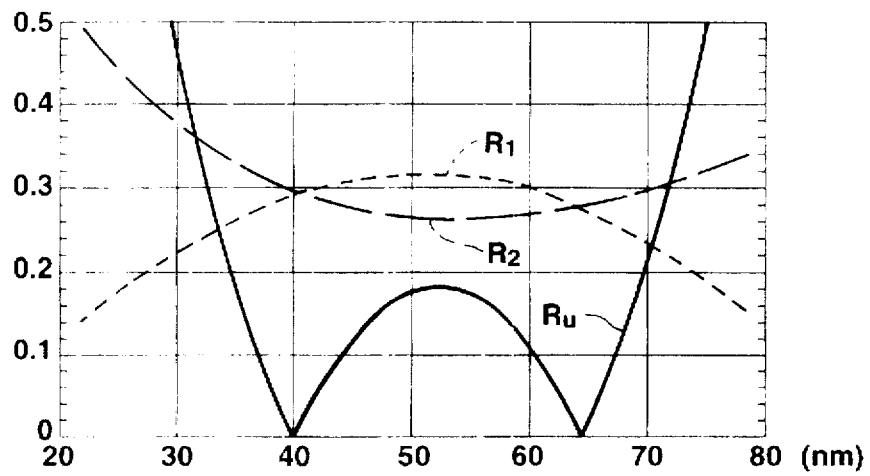
FIG. 20A is a characteristic graph indicating $R_1$, $R_2$, and $R_u$ in a case of a wave length of 635 nm (where, n=3.08 and k=0.18 at a time of the wave length=635 nm)
Figure 20B:
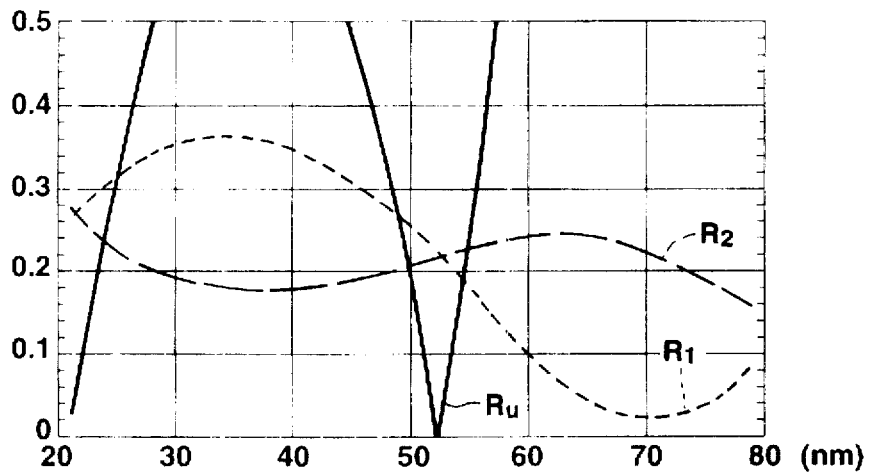
FIG. 20B is a characteristic graph indicating $R_1$, $R_2$, and $R_u$ in a case of a wave length of 480 nm (where, n=3.4 and k=0.3 at a time of the wave length=480 nm)
Figure 21A:
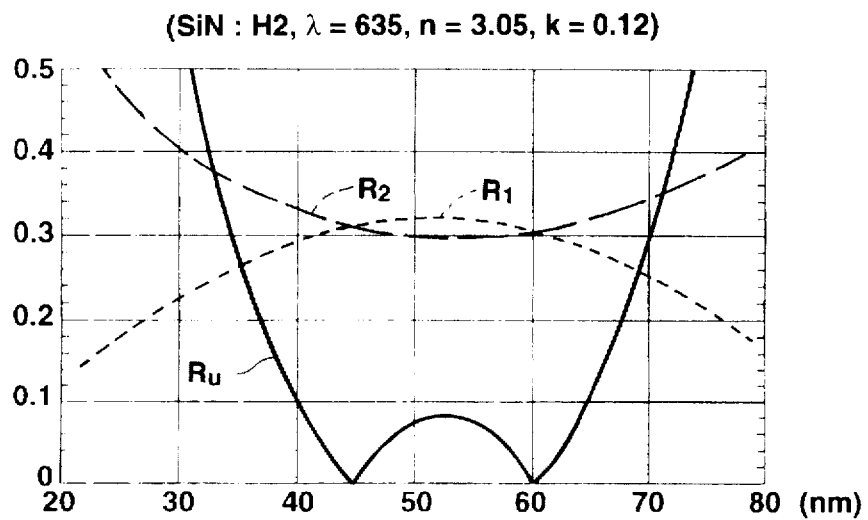
FIG. 21A is a characteristic graph indicating $R_1$, $R_2$, and $R_u$ in a case of a wave length of 635 nm (where, n=3.05 and k=0.12 at a time of the wave length=635 nm)
Figure 21B:
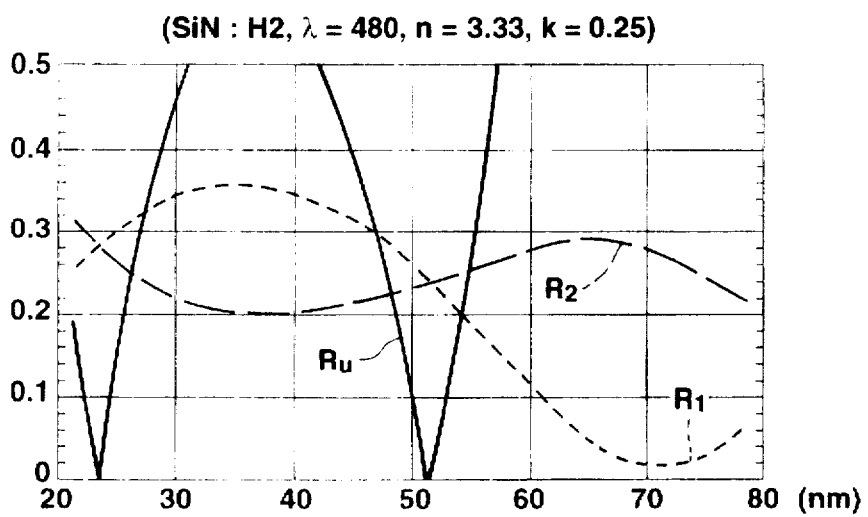
FIG. 21B is a characteristic graph indicating $R_1$, $R_2$, and $R_u$ in a case of a wave length of 480 nm (where, n=3.33 and k=0.25 at a time of the wave length=480 nm)
Figure 22A:
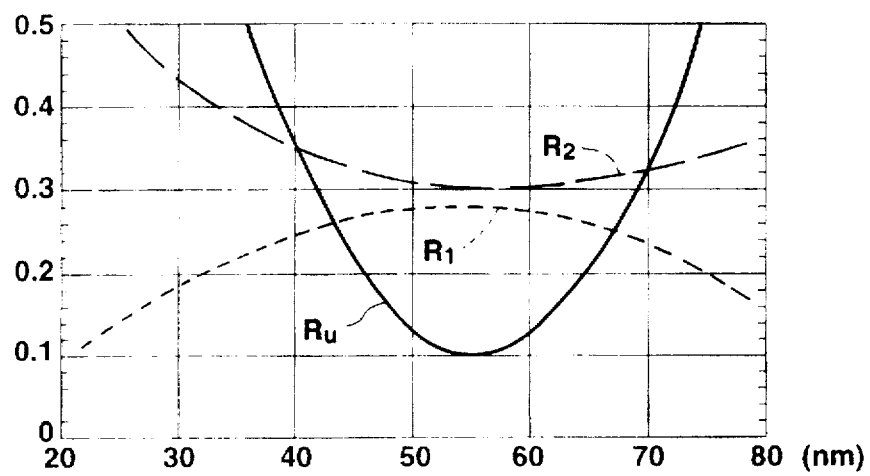
FIG. 22A is a characteristic graph indicating $R_1$, $R_2$, and $R_u$ in a case of a wave length of 635 nm (where, n=2.90 and k=0.16 at a time of the wave length=635 nm)
Figure 22B:
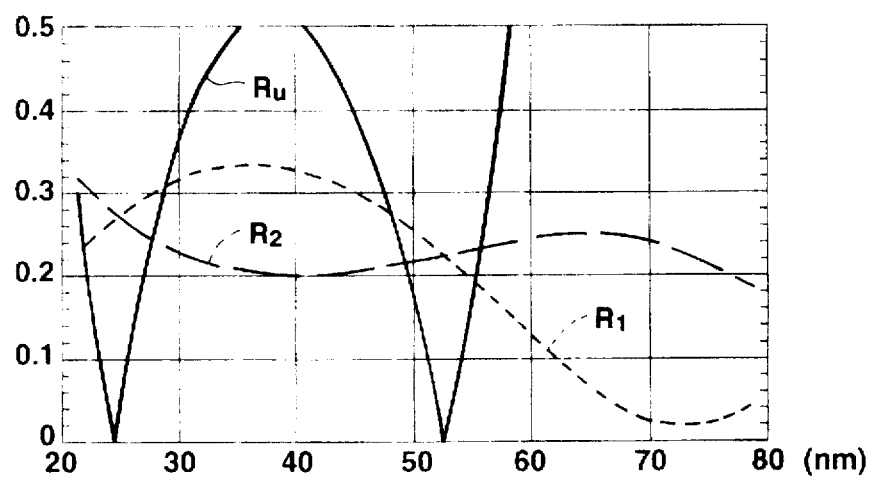
FIG. 22B is a characteristic graph indicating $R_1$, $R_2$, and $R_u$ in a case of a wave length of 480 nm (where, n=3.25 and k=0.29 at a time of the wave length=480 nm)
Figure 23A:
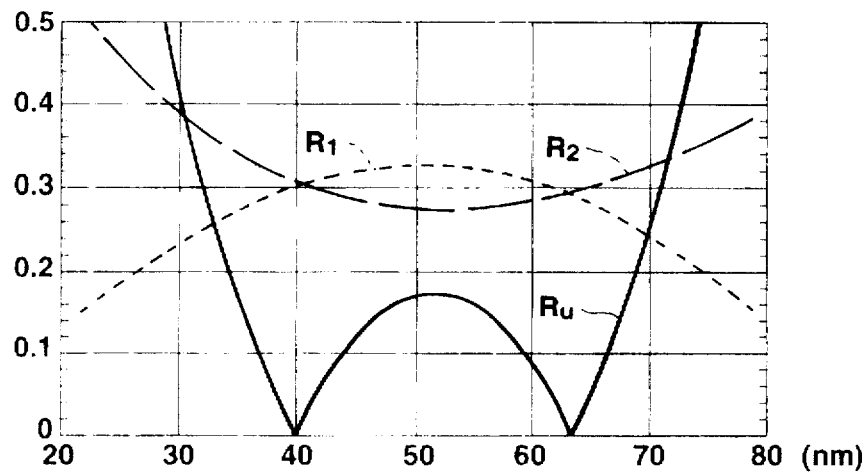
FIG. 23A is a characteristic graph indicating $R_1$, $R_2$, and $R_u$ in a case of a wave length of 635 nm (where, n=3.10 and k=0.14 at a time of the wave length=635 nm)
Figure 23B:
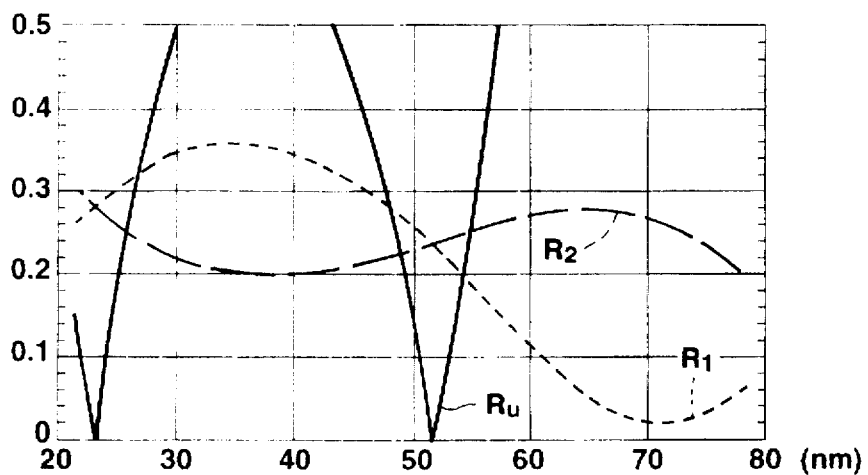
FIG. 23B is a characteristic graph indicating $R_1$, $R_2$, and $R_u$ in a case of a wave length of 480 nm (where, n=3.35 and k=0.26 at a time of the wave length=480 nm)
Figure 24A:
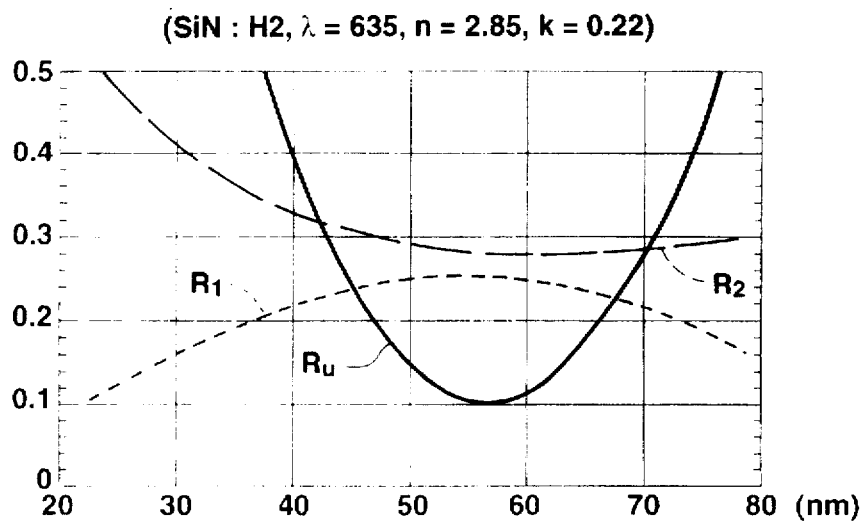
FIG. 24A is a characteristic graph indicating $R_1$, $R_2$, and $R_u$ in a case of a wave length of 635 nm (where, n=2.85 and k=0.22 at a time of the wave length=635 nm)
Figure 24B:
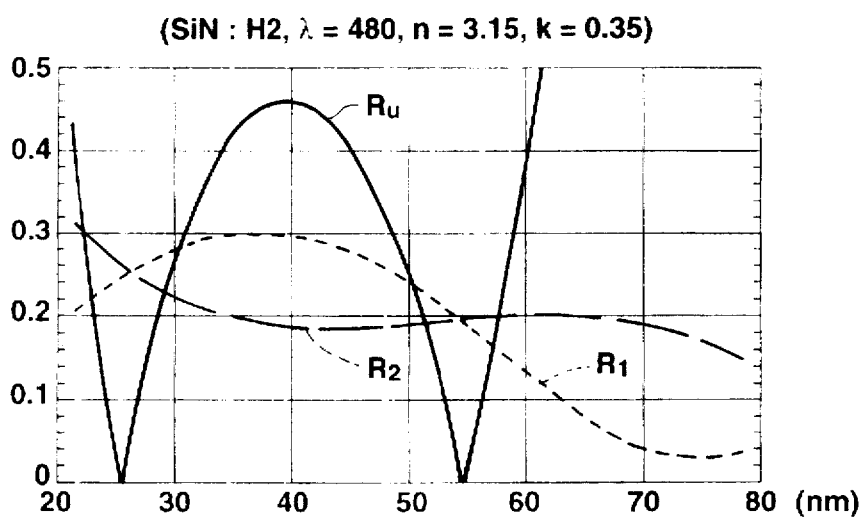
FIG. 24B is a characteristic graph indicating $R_1$, $R_2$, and $R_u$ in a case of a wave length of 480 nm (where, n=3.15 and k=0.35 at a time of the wave length=480 nm)
Figure 25A:
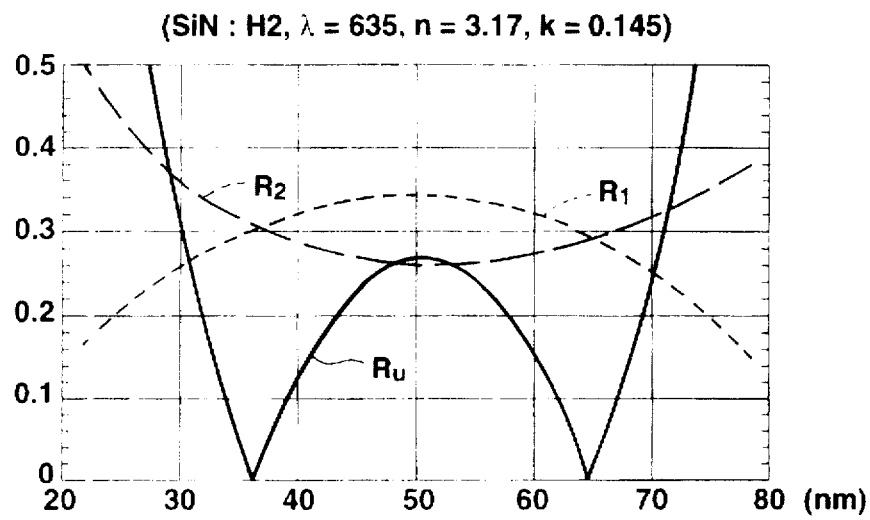
FIG. 25A is a characteristic graph indicating $R_1$, $R_2$, and $R_u$ in a case of a wave length of 635 nm (where, n=3.17 and k=0.145 at a time of the wave length=635 nm)
Figure 25B:
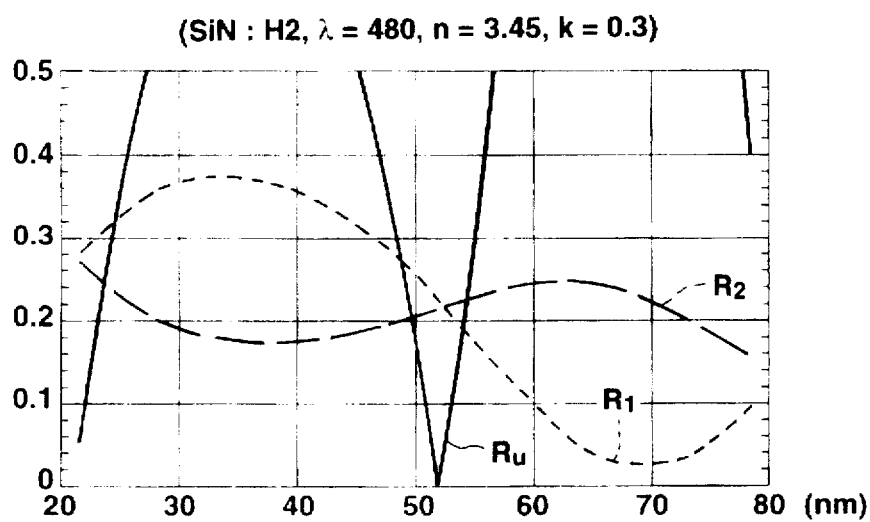
FIG. 25B is a characteristic graph indicating $R_1$, $R_2$, and $R_u$ in a case of a wave length of 480 nm (where, n=3.45 and k=0.3 at a time of the wave length=480 nm)

In the multi-layer optical disk having the above mentioned configuration, in order to read out the information of the two information memory layers from a surface of one information memory layer, it is necessary that signals from the first information memory layer 2 and the second information memory layer 4 are sufficiently large when read light is irradiated from the a surface of one information layer. In other words, this means that a reflectivity $R_1$ of the first information memory layer 2 and a reflectivity $R_2$ of the second information memory layer 4 shown in FIG. 4 are sufficiently large. It is desirable that the reflectivity are 20% or more and 40% or less to obtain a correct reproduction signal.

Since it is necessary to adjust the signal amounts and make them uniform at a time of reproducing the signals and a circuit configuration become complicated, it is undesirable that the amount of signal from the first information memory layer 2 is largely different from that of signal from the second information memory layer 4.

As a result, it is necessary that a difference between the reflectivity $R_1$ of the first information memory layer 2 and the reflectivity $R_2$ of the second information memory layer 4 is small. For example, in a case of setting $R_u$ represented by a following formula, it is desirable that a value of $R_u$ is 0.2 or less in order to obtain the correct reproduction signal.

$$= 2 \frac{(R) - (R)}{(R) + (R)}$$

The inventor of the present invention paid attention to the material used in the first information memory layer 2 which is assumed to have much influence on the above mentioned conditions in order to develop a multi-layer optical disk which meets the above conditions in both cases of the wave lengths of 635 nm and 480 nm. They examined various materials having the different refractive index n and different extinction coefficient k, and came to the conclusion described below.

(1) The refractive index n and the extinction coefficient k are limited which meet the conditions to function as the multi-layer optical disk in both the wave lengths of 635 nm and 480 nm. It is n=α-k+2.8 (α is a constant) in the wave length of 635 nm. However, this is limited to an area indicated by $0.15 \leq \alpha \leq 0.45$ and $0 \leq k \leq 0.25$ (refer to FIG. 1).

However, when considering an allowable film thickness range, the range $0.25 \leq \alpha \leq 0.35$ is more desirable.

(2) It is desirable that the amounts of change of the refractive index n and the extinction coefficient k are small in both the wave lengths. Especially, it is desirable that the amount of change Δk of the extinction coefficient k is 0.3 or less.

Incidentally, values of the refractive index n and the extinction coefficient k in the material depends on conditions for generating (the conditions for film-forming, such as gas pressure at a time of spattering, the spattering speed and the like). The values can be also adjusted by adding the other element.

There are several materials which can meet the above mentioned conditions in the wave length of 635 nm. A table 1 shows the refractive indexes n and the extinction coefficients k, in the wave lengths of 635 nm and 480 nm, of the material, to which copper oxide (Cu—O), silicon (Si), silicon nitride (Si—N), hydrogen-addition silicon nitride (Si—N—H) or hydrogen addition silicon oxide (Si—O—H) that are adjusted as the first information memory layer of the multi-layer optical disk for the read light wave length of 635 nm is added, and the values of the reflectivity $R_1$, $R_2$ and $R_u$ when constituting the multi-layer optical disk having the above mentioned construction.

TABLE 1

| Material | Film Thickness (nm) | 635 nm | | | | |
|---|---|---|---|---|---|---|
| | | n | k | $R_1$ | $R_2$ | $R_U$ |
| Cu—O | 58 | 2.98 | 0.11 | 30 | 32 | 0.06 |
| Si | 15 | 4.20 | 0.40 | 27 | 27 | 0 |
| SI—N | 60 | 2.95 | 0.16 | 28 | 30 | 0.07 |
| Si—O—H | 51 | 3.01 | 0.02 | 34 | 36 | 0.08 |
| Si—N—H(1) | 54 | 3.01 | 0.04 | 33 | 34 | 0.05 |
| Si—N—H(2) | 50 | 3.05 | 0.02 | 35 | 35 | 0.01 |

| Material | 480 nm | | | | | |
|---|---|---|---|---|---|---|
| | n | k | $R_1$ | $R_2$ | $R_U$ | Δk |
| Cu—O | 3.10 | 0.44 | 16 | 16 | 0.01 | 0.33 |
| Si | 4.49 | 1.28 | 36 | 7 | 1< | 0.08 |
| SI—N | 3.00 | 0.51 | 13 | 12 | 0.08 | 0.35 |
| Si—O—H | 3.42 | 0.22 | 25 | 25 | 0.01 | 0.20 |
| Si—N—H(1) | 3.30 | 0.34 | 20 | 20 | 0.01 | 0.30 |
| Si—N—H(1) | 3.35 | 0.16 | 28 | 28 | 0.01 | 0.14 |

All of the materials indicated in the table 1 can sufficiently obtain the reflectivity for the first information memory layer 2 and the second information memory layer 4 in the wave length of 635 nm. Further, a difference between the reflectivity of the first information memory layer 2 and that of the second information memory layer 4 is sufficiently small. That is, it is understood that if using the materials described in the table 1, the multi-layer optical disk can be constituted in the read light wave length of 635 nm.

However, when the same materials are constituted under the same film thickness, a correct signal performance is not always obtained and some of the above mentioned conditions are not met, in a case of using as the read light wave length of 480 nm.

For example, in a case of using the copper oxide, when using the wave length of 635 nm, $R_1$ is 30%, $R_2$ is 32% and $R_u$ is 0.06, which are sufficiently small. Thus, it is possible to constitute the multi-layer optical disk. On the other hand, although the reflectivity of both the information memory layers are uniform in an area of the wave length of 480 nm, both of them are 16%, which is low. As a result, this material is not suitable for the multi-layer optical disk.

In a case of using Si, the multi-layer optical disk can be constituted in an area of the wave length of 635 nm. However, in a case of using the same configuration of Si, in the wave length of 480 nm, the difference between the reflectivity of both the information memory layers becomes large. Thus, it is found that this material is not suitable for the multi-layer optical disk.

In contrast with this, both of the hydrogen addition silicon oxide (Si—O—H) and the hydrogen addition silicon nitride (Si—N—H; the amounts of the added hydrogen are different from each other in (1) and (2) of the table.) comply with the performance as the multi-layer optical disk in both the wave lengths of 635 nm and 480 nm. Further, an optical disk having a large capacity is completed which can process both the information in the first information memory layer 2 and the second information memory layer 4, and the compatibility can be reserved under the two types of the wave lengths.

Next, in a case of the hydrogen addition silicon nitride, the amount of the added hydrogen, the film forming condition and the like are changed. Then, the first information memory layer 2 having various refractive indexes n and the extinction coefficients k are film-formed, so that the film thickness dependencies of $R_1$, $R_2$ and $R_u$ are measured in both the wave lengths of 635 nm and 480 nm.

The results are shown in FIGS. 5 to 25. The figure A in each figure indicates the results of the film thickness dependencies which are measured at the wave length of 635 nm, and the figure B indicates the measured result at the wave length of 480 nm. $R_u$ is represented by a solid line. $R_1$ is represented by a dotted line. $R_2$ is represented by a broken line. A horizontal axis in a graph indicates the film thickness (nm) of the layer, and a vertical axis indicates the reflectivity with respect to $R_1$ and $R_2$, and the ratio on the basis of $R_1$ and $R_2$ with respect to $R_u$. Incidentally, the figure B is omitted in a case that there is no film thickness area in which $R_u$ complies with the value equal to or less than 0.2 under the wave length of 635 nm.

Figure 1:
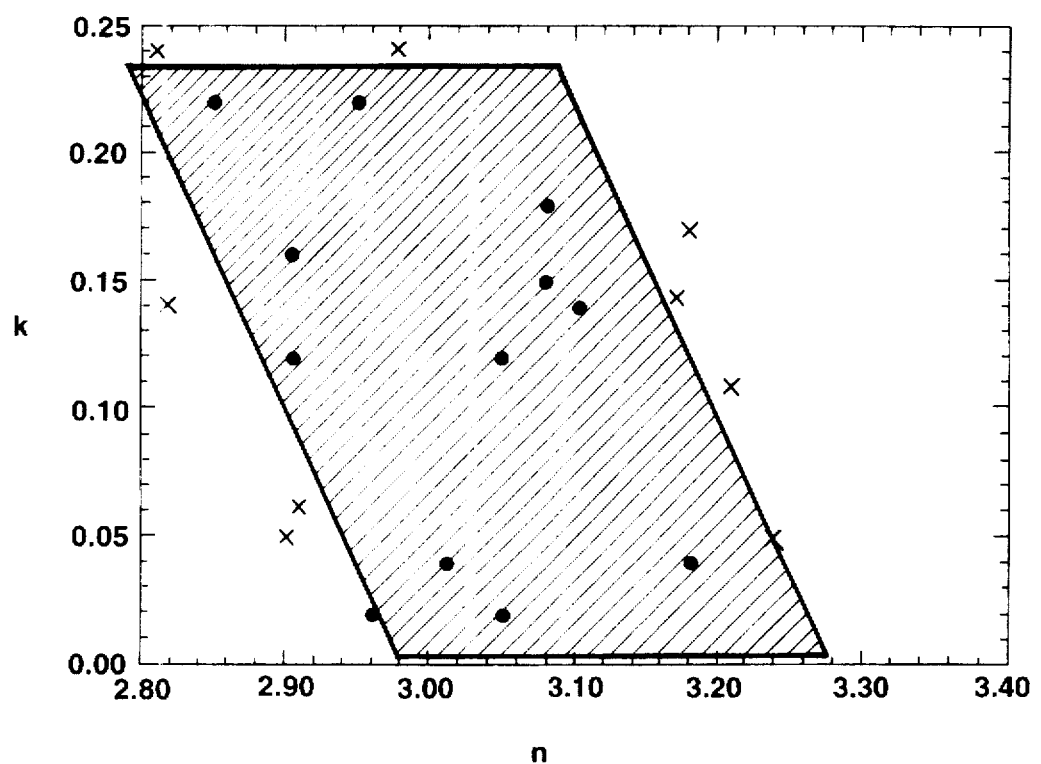
FIG. 1 is a characteristic graph indicating a correct range between a refractive index n and an extinction coefficient k in a first information memory layer.

Each measurement shown in FIGS. 5 to 25 has been conducted under conditions corresponding to each point plotted in FIG. 1. That is, at the points plotted by the refractive index n and the extinction coefficient k which lie within a slant line area shown in FIG. 1, the first information memory layer can have the common overlapped film thickness ranges, which satisfy the requirements that the reflection coefficient $R_1$ of the first information memory layer 2 is equal to or more than 20%, the reflection coefficient $R_2$ of the second information memory layer 4 is equal to or more than 20% and $R_u$ is equal to or less than 0.2, with respect to both the read lights having wavelength of 635 nm and 480 nm.

As a result, it is possible to constitute the multi-layer optical disk having the compatibility between the two wave lengths of 635 nm and 480 nm.

On the other hand, in a sample departing from the slant line area in FIG. 1, the above mentioned film thickness ranges do not overlap with respect to the read light having the wave lengths of 635 nm and 480 nm. Thus, it is not possible to implement the multi-layer optical disk having the two wave length compatibility.

In any samples, a condition in which the compatibility can be reserved between the two wave lengths is limited to a case in which the film thickness of the first information memory layer 2 is close to 50 nm. For this reason, it is understood that the thickness of the first information memory layer 2 is desirable to be within a range from 40 nm to 60 nm.

Many widely different embodiments of the present invention may be constructed without departing from the spirit and scope of the present invention. It should be understood that the present invention is not limited to the specific embodiments described in the specification, except as defined in the appended claims.

What is claimed is:

1. A multi-layer optical disk, in which a first information memory layer and a second information memory layer are sequentially film-formed on a substrate and information recorded on the first information memory layer and the second information memory layer are reproduced by irradiating a read light thereon from a substrate side, wherein information recorded on said first information memory layer and information recorded on said second information memory layer are both reproduced by a first read light and a second read light which is shorter in wave length than the first read light when irradiated by one of said first and second read lights, and wherein the first information memory layer is made of a silicon material in which a refractive index n and an extinction coefficient k in a wave length range of said first read light comply with the following conditions:

$0 \leq k \leq 0.25$ $n = \alpha \cdot k + 2.8$ (where $\alpha$ is a constant and $0.15 \leq \alpha \leq 0.45$).

2. A multi-layer optical disk according to claim 1, wherein a difference $\Delta k$ between an extinction coefficient in a wave length range of the first read light of the first information memory layer and an extinction coefficient in a wave length range of the second read light is not greater than 0.3.

3. A multi-layer optical disk according to claim 1, wherein the wave length range of the first read light is between 630 nm and 690 nm.

4. A multi-layer optical disk according to claim 1, wherein the first information memory layer is made of an Si-system material having hydrogen and at least one of nitride and oxygen.

5. A multi-layer optical disk according to claim 1, wherein a film thickness of the first information memory layer is between 40 nm and 60 nm.

6. A multi-layer optical disk according to claim 1, wherein a spacer layer is formed between the first information memory layer and the second information memory layer.

* * * * *